United States Patent [19]

McColgan

[11] 3,926,884

[45] Dec. 16, 1975

[54] ABS RESIN COMPOUNDS

[76] Inventor: John M. McColgan, 1623 Roscomare Road, Los Angeles, Calif. 90024

[22] Filed: Oct. 18, 1974

[21] Appl. No.: 515,860

[52] U.S. Cl.. 260/28.5 AS; 260/28.5 R; 260/28.5 B
[51] Int. Cl.² ........................................ C08L 91/00
[58] Field of Search .... 260/28.5 AS, 28.5 B, 28.5 R

[56] References Cited
UNITED STATES PATENTS

| | | | |
|---|---|---|---|
| 2,779,745 | 1/1957 | Howland | 260/28.5 B |
| 3,314,907 | 4/1967 | Fronczak | 260/28.5 AS |
| 3,790,519 | 2/1974 | Wahlborg | 260/28.5 AS |

*Primary Examiner*—Melvyn I. Marquis
*Attorney, Agent, or Firm*—William P. Green

[57] ABSTRACT

A resinous plastic molding or extrusion compound of the ABS (acrylonitrile-butadiene-styrene) type, containing an additive material selected from the group consisting of air blown asphalt, gilsonite, and mixtures thereof, to improve the impact resistance and/or other structural characteristics of the basic ABS compound, or to maintain the characteristics of the basic compound with minimum degradation while reducing substantially the overall cost of the ultimate composition per unit quantity.

8 Claims, No Drawings

ABS RESIN COMPOUNDS

BACKGROUND OF THE INVENTION

This invention relates to improved compositions for ABS (acrylonitrile-butadiene-styrene) resinous plastic compositions.

In recent years, plastics of the type commonly referred to as ABS resins have become extremely popular for many uses because of their advantageous physical characteristics, including high impact strength, tensile strength, chemical resistance and heat resistance. The plastics of this unique family are discussed and defined in detail in various publications, including for example the text entitled "ABS Plastics" by C. H. Basdekis, published in 1964 by Reinhold Publishing Corporation, New York. The ABS plastics are composed primarily of three monomeric chemicals, specifically acrylonitrile, butadiene and styrene, all of which are polymerized in the ultimate composition. Defined more specifically, the ABS plastics are composed primarily of styreneacrylonitrile copolymer as a continuous phase, and a dispersed phase of butadiene-acrylonitrile rubber or of a butadiene containing rubber onto which styrene-acrylonitrile monomers are grafted. A process for forming a graft polymer of the three constituents is disclosed in U.S. Pat. No. 3,168,593 issued Feb. 2, 1965.

One disadvantage of ABS plastics has resided in their relatively high cost, which has from a practical standpoint precluded use of the ABS plastics in many situations in which their physical characteristics would be desirable. To overcome this cost factor, there have been incorporated in some ABS compounds various types of low cost filler materials, such as talc, calcium carbonate, clay etc., to extend the material and reduce the overall cost per pound. However, addition of these filler materials previously proposed has been accompanied in every instance by a substantial reduction in impact strength and other properties.

Other additives are sometimes added to a particular ABS compound to upgrade its impact strength and/or other properties for a particular end use. For example, impact strength can be improved by blending into the basic ABS compound a methacrylatebutadiene-styrene (MBS) polymer, chlorinated polyethylene, a high butadiene ABS concentrate, or the like. This approach, however, has the disadvantage of vastly increasing the overall cost of the compound, and also in the case of chlorinated polyethylene, adversely affecting processing ease and thermal stability of the compound.

SUMMARY OF THE INVENTION

The present invention provides an improved composition in which an acrylonitrile-butadiene-styrene compound is extended by intimate blending with an extremely low cost additive or combination of additives which greatly reduce the overall cost of the composition, but at the same time actually increase its impact strength and other properties, or at the very least maintain those properties at or near the same levels as if the extender had not been added. The invention may render ABS plastics practical for use in an entire series of applications for which their use has not heretofore been economically feasible.

To accomplish these results, I employ as the discussed additive a material selected from the group consisting of air blown asphalt, gilsonite, and mixtures of these substances. For best results, the air blown asphalt or gilsonite should be selected to have a softening point, by the conventional ring and ball test, of between about 250° F. and 320° F., optimally between about 265° F. and 285° F.

DESCRIPTION OF THE PREFERRED EMBODIMENTS

The air blown asphalt which is utilized in the present compositions is produced in conventional and well-known manner by blowing air upwardly through a body of asphalt at high temperature, to gradually change the composition of the asphalt in a manner progressively increasing its melting point and softening point. The process is terminated when the softening point has reached a desired value within the above defined preferred and optimum ranges. Air blown asphalt produced in this manner and having any selected softening point within these ranges is readily available on the market today at a cost very small as compared with that of the ABS resins.

The gilsonite which may be utilized in lieu of or in admixture with the air blown asphalt is a naturally occurring substance having physical and chemical characteristics very similar to air blown asphalt. Gilsonite occurs naturally in the states of Utah and Colorado, and is also readily available at low cost. The particular form of gilsonite presently preferred for use in my compositions is that sold by American Gilsonite Company of Salt Lake City, Utah, as "American Gilsonite Selects."

The basic ABS compound to which the air blown asphalt and/or gilsonite are added may be any of the numerous types of such compounds in which the principle constituents are acrylonitrile, butadiene and styrene polymers. The most desirable polymers of this type are those of the character disclosed in U.S. Pat. No. 3,168,593, in which there appears to be a graft polymerization of styrene-acrylonitrile monomers onto a butadiene containing rubber. In addition to this type of compound, however, the present additives are also very useful in conjunction with earlier type ABS compounds made by mechanical blending of styrene-acrylonitrile polymer with a butadiene-acrylonitrile polymer. Further, any other compound within the ABS family may be employed, such as an intimate mechanical mixture of a low cost styrene-acrylonitrile (SAN) polymer with a small amount of a three constituent terpolymer or grafted polymer of acrylonitrile, butadiene and styrene.

In order to attain the advantageous results of the present invention, it is essential that the air blown asphalt and/or gilsonite be mixed very intimately and at fine particle size with the ABS resin containing the polymerized and preferably copolymerized acrylonitrile, butadiene and styrene. This intermixing of the additive with the basic ABS compound should be carried out in an intensive mixer, such as a "Banbury" mixer. This intensive mixing should be carried out at an elevated temperature, preferably between about 350° F. and 400° F., optimally 375° F. The mixing should continue for a period sufficient to attain extremely small particle size and intimate mixture of the ingredients, say for example a period of four minutes in a Banbury mixer. After such intensive mixing, the product is pelletized, and may then be injection molded, or extruded, by conventional techniques and at conventional temperatures, say for example 410° F.

In addition to the basic ABS compound or compounds and the discussed air blown asphalt and/or gilsonite, there may also be incorporated in the compound any other conventional or desired additives for giving particular characteristics to the ultimate product. For example, the compound may include minor amounts of colorants, antioxidants, lubricants, etc. These additives may be supplied to the compound in finely divided form and be mixed into the other ingredients simultaneously with the air blown asphalt and gilsonite, and in the same intensive mixer. These other additives normally constitute a very small amount of the overall composition, say not over a five percent by weight. The total amount of air blown asphalt and/or gilsonite in the composition should in most instances be not over about 20 percent of the total composition by weight. The three basic resin constituents (acrylonitrile, butadiene and styrene) should together constitute at least about 50 percent of the overall composition by weight, preferably at least about 75 percent.

To further clarify the invention, the following examples are given of particular compositions which have been produced and have proven by tests to have unexpectedly upgraded properties:

EXAMPLE 1.

A composition was formed from the following ingredients:

80 parts of a typical commerically available ABS compound having a low butadiene content as compared with its acrylonitrile-styrene content, and specifically the product sold by Rexene Polymers Inc. of Paramus, N.J. as ABS compound number "301K."
10 parts of a methacrylate-butadiene-styrene (MBS) impact increasing resin, specifically that sold by Rohm and Haas as MBS resin number 611.
10 parts of air blown asphalt having a ring and ball softening point of approximately 271° F.

These ingredients were all fed into a Banbury intensive mixer and were mixed therein for four minutes at a temperature of 375° F. The resultant extremely intimate intermixture was pelletized, and then melted and molded in an injection molding machine at 410° F., and under sufficient pressure to effect the molding operation.

The molded products were found to have the following properties:

| | |
|---|---|
| Notched izod impact strength at 73° F. | 7.1 Ft.lbs./in. |
| Notched izod impact strength at −40° F. | 2.1 Ft.lbs./in. |
| Ultimate tensile strength | 5800 psi |
| Deflection temperature under load | 186° F. |

These impact and tensile strengths were vastly improved as compared with the strengths attained when the same ABS compound (Rexene ABS compound number 301K) is utilized alone. This substance when molded by itself has the following properties:

| | |
|---|---|
| Notched izod impact strength at 73° F. | 4.1 Ft.lbs./in. |
| Notched izod impact strength at −40° F. | 1.2 Ft.lbs./in. |
| Ultimate tensile strength | 4600 psi |
| Deflection temperature under load | 185° F. |

EXAMPLE 2

A composition was formed consisting of the following ingredients:

30 parts of a high butadiene content ABS rubber, specifically the product sold by International Synthetic Rubber of London, England as "SC 650," having a 60 percent butadiene content.
60 parts of styrene-acrylonitrile polymer (SAN), specifically that sold by Rexene Polymers Inc. as "Rexene 106"
10 parts of air blown asphalt having a ring and ball softening point of 280° F., as sold by Witco Chemical Company.

These ingredients were blended intimately together in a Banbury intensive mixer for four minutes at 375° F., then pelletized and injection molded as in Example 1, and gave the following test results:

| | |
|---|---|
| Izod impact strength at 73° F. | 4.9 Ft.lbs./in. |
| Ultimate tensile strength | 4500 psi |

Omitting the 10 parts of air blown asphalt and substituting therefor 10 additional parts of Rexene 106, the following test results were achieved:

| | |
|---|---|
| Izod impact strength at 73° F. | 3.6 Ft.lbs./in. |
| Ultimate tensile strength | 4850 psi |

Thus, the addition of the very low cost air blown asphalt actually increased the Izod impact strength from 3.6 Ft.lbs./in. to 4.9 Ft.lbs./in., whereas it would be expected that the strength would be substantially degraded by the air blown asphalt.

EXAMPLE 3

The following ingredients were intensively mixed together and molded as discussed in Example 1:

100 parts of a very high quality grafted polymer ABS compound, specifically that sold by Japan Synthetic Rubber Company, Tokyo, Japan as "JSR 10"
10 parts of air blown asphalt having a softening point of 280° F., as sold by Witco Chemical Company.

The molded product produced from this compound evidenced the following properties under tests:

| | |
|---|---|
| Izod impact strength at 73° F. | 9.9 Ft.lbs./in. |
| Ultimate tensile strength | 3920 psi |

EXAMPLE 4

The following fourth compound was mixed and molded as discussed:

100 parts JSR 10 of Japan Synthetic Rubber Company
10 parts of gilsonite-sold by American Gilsonite Company as "American Gilsonite Selects"— ring and ball softening point 300° to 320° F.

The product molded from this composition had the following properties:

| | |
|---|---|
| Izod impact strength at 73° F. | 7.8 Ft.lbs./in. |
| Ultimate tensile strength | 4193 psi |
| Deflection temperature under load | 185° F. |

The ABS resin utilized in Examples 3 and 4 (Resin JSR 10), when molded separately, without either the blown asphalt additive of Example 3, or the gilsonite additive of Example 4, but with all other mixing and molding conditions kept the same, produced molded products having the following characteristics:

| | |
|---|---|
| Izod impact strength at 73° F. | 7.5 Ft.lbs./in. |
| Ultimate tensile strength | 4635 psi |
| Deflection temperature under load | 184° F. |

It is noted that in both Example 3 and Example 4, the Izod impact strength was increased over the corresponding strength attained when gilsonite and/or blown asphalt were not added to the JSR 10 compound. Thus, a much lower cost compound has produced increased impact strength, a result which would not be expected.

Without intending to be bound by any theoretical explanation of the improved characteristics obtained by use of air blown asphalt and gilsonite in ABS compounds, it is currently believed that the mechanism whereby these materials contribute to the impact strength of ABS compounds is similar to that descirbed for the rubber phase of ABS compounds by C. H. Basdekis on pages 55 to 60 of his above mentioned publication "ABS Plastics".

While certain specific embodiments of the present invention have been disclosed as typical, the invention is of course not limited to these particular forms, but rather is applicable broadly to all such variations as fall within the scope of the appended claims.

I claim:

1. An extended ABS type resinous plastic composition comprising:
   polymerized acrylonitrile, butadiene and styrene constituting together at least about 50 percent of the composition by weight; and
   a material intimately mixed with said polymerized acrylonitrile, butadiene and styrene and selected from the group consisting of air blown asphalt, gilsonite, and mixtures thereof, and constituting not more than about 20 percent of the composition by weight.

2. A composition as recited in claim 1, in which said material is air blown asphalt.

3. A composition as recited in claim 1, in which said material is gilsonite.

4. A composition as recited in claim 1, in which said polymerized acrylonitrile, butadiene and styrene constitute together at least about 75 percent of the composition by weight.

5. An extended ABS type resinous plastic composition comprising:
   polymerized acrylonitrile, butadiene and styrene constituting together at least about 50 percent of the composition by weight; and
   a material intimately mixed with said polymerized acrylonitrile, butadiene and styrene and selected from the group consisting of air blown asphalt, gilsonite, and mixtures thereof, and constituting not more than about 20 percent of the composition by weight;
   said material selected from the group consisting of air blown asphalt, gilsonite, and mixtures thereof having a ring and ball softening point in the range of about 250° F. to about 320° F.

6. A composition as recited in claim 5, in which said material selected from the group consisting of air blown asphalt, gilsonite, and mixtures thereof has a ring and ball softening point in the range of about 265° F. to about 285° F.

7. A composition as recited in claim 5, in which said material is air blown asphalt.

8. A composition as recited in claim 5, in which said material is gilsonite.

* * * * *